United States Patent [19]

Johnson, Jr.

[11] 4,259,095

[45] Mar. 31, 1981

[54] BAG-TYPE FILTER APPARATUS WITH COMBINATION BAG SUPPORT AND AIR DIFFUSER

[76] Inventor: Allen S. Johnson, Jr., P.O. Drawer 1037, Salisbury, N.C. 28144

[21] Appl. No.: 76,942

[22] Filed: Sep. 26, 1979

[51] Int. Cl.³ .............................................. B01D 46/04
[52] U.S. Cl. ........................................ 55/302; 55/379
[58] Field of Search ..................... 55/302, 341 R, 379; 210/333 R, 356, 411, 427

[56] References Cited

U.S. PATENT DOCUMENTS

| | | | |
|---|---|---|---|
| 3,206,178 | 9/1965 | Lamb | 55/293 X |
| 3,291,310 | 12/1966 | Marvel | 55/379 X |
| 3,471,024 | 10/1969 | Doucet | 210/411 X |
| 3,633,753 | 1/1972 | Petitjeun | 55/379 X |
| 3,633,757 | 1/1972 | Madern et al. | 55/379 X |

*Primary Examiner*—Kathleen J. Prunner
*Attorney, Agent, or Firm*—Bell, Seltzer, Park & Gibson

[57] ABSTRACT

In order to achieve improved cleaning of a tubular filter bag when a reverse purge of air is directed into the filter bag, there is provided interiorly of the filter bag an elongate tube which is constructed in such a way as to serve for supporting and holding the filter bag in an open tubular configuration and for also diffusing and distributing air directed to the filter bag when a reverse purge of air is directed into the filter bag for cleaning of the filter bag. The elongate tube has peripheral portions extending outwardly beyond other portions of the tube for engaging and holding the surrounding filter bag, and the portions of the tube located inwardly therefrom have perforations located for diffusing and distributing the reverse purge of air directed into the filter bag.

10 Claims, 8 Drawing Figures

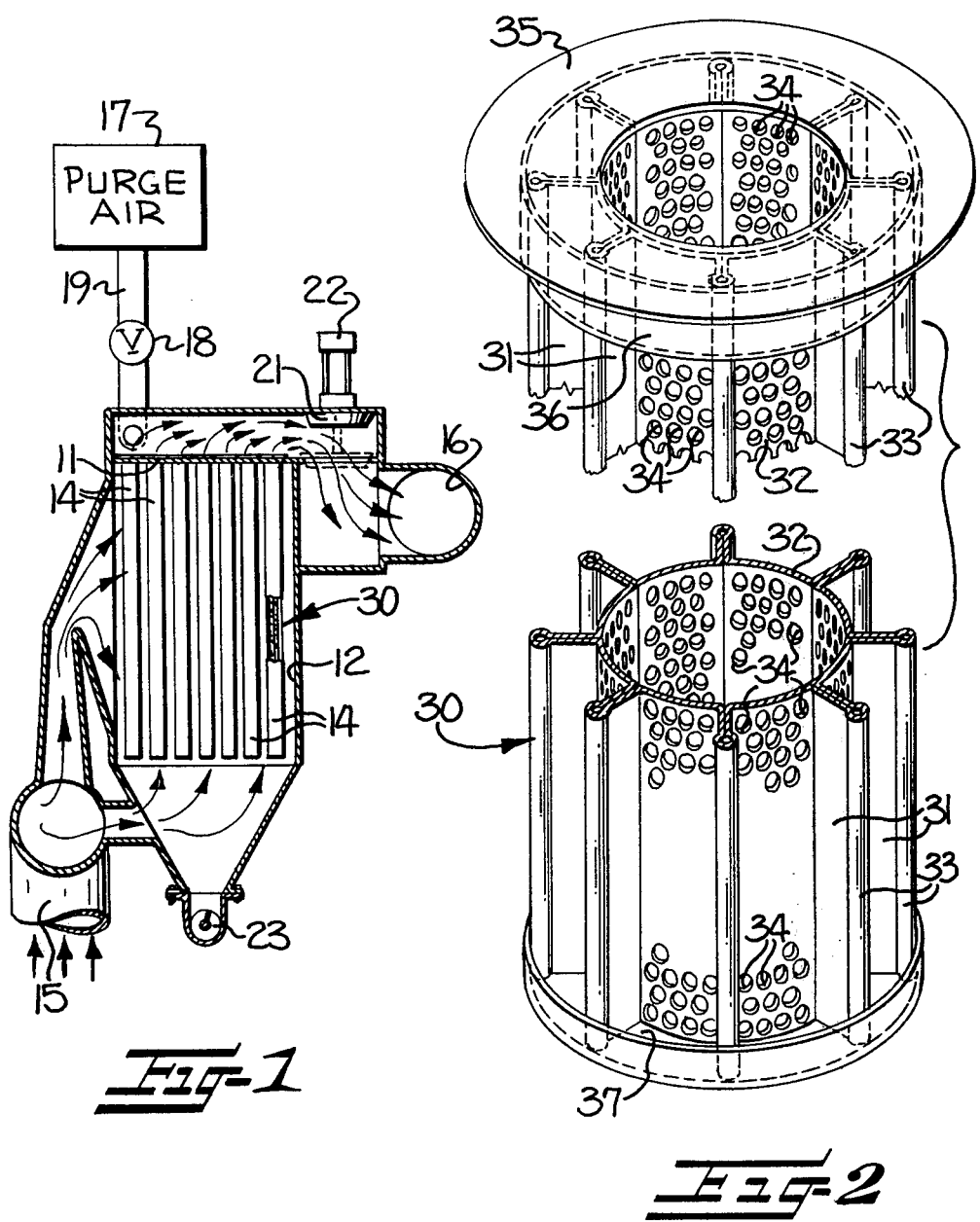

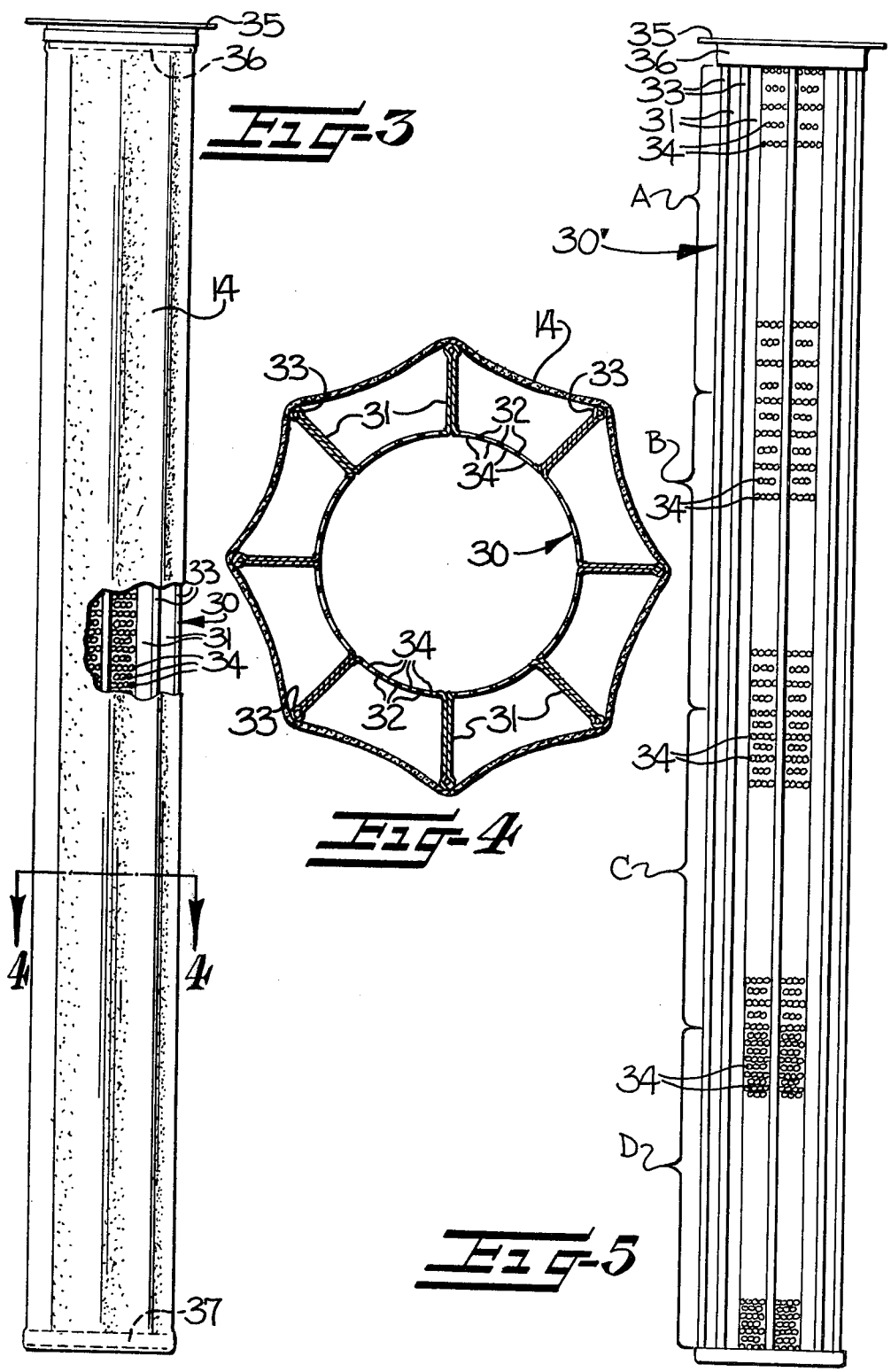

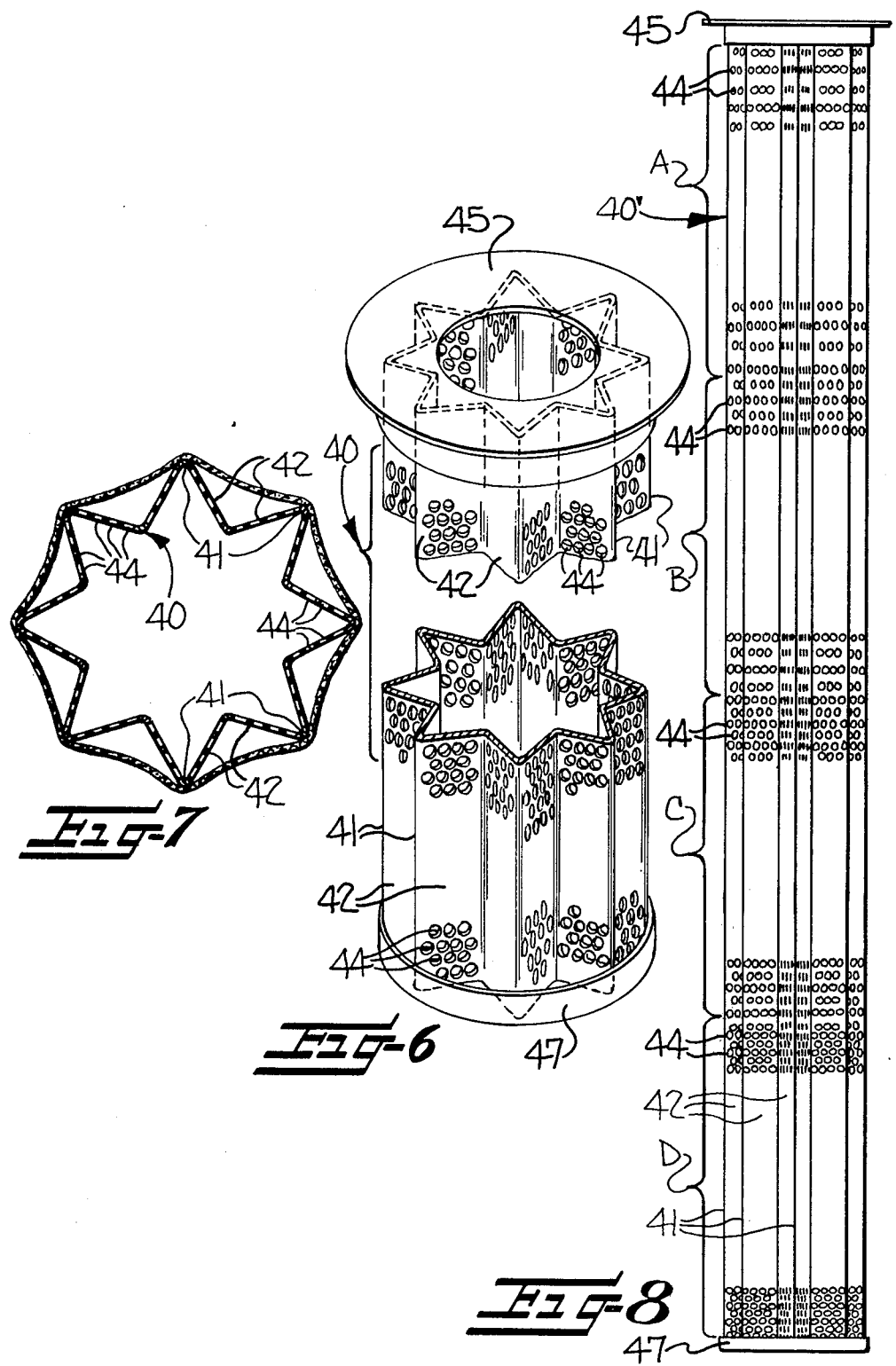

BAG-TYPE FILTER APPARATUS WITH COMBINATION BAG SUPPORT AND AIR DIFFUSER

BACKGROUND OF THE INVENTION

This invention relates to a filtering apparatus of the type utilizing elongate baglike tubular filters for filtering particulate material which is entrained in a gas stream. A filtering apparatus of this type generally includes a multiplicity of tubular filter bags mounted in a filter housing or "baghouse" with each filter bag having a tubular supporting frame or "cage" positioned therein so as to hold the filter bag in an open tubular configuration. Particulate-laden gas is directed into the filter housing and flows through the gas permeable filter bags while the particulate material is filtered and retained on the exterior surface of the filter bags. Periodically, a reverse purge of air is directed into the outlet end of the tubular filter bags for dislodging the trapped particulate material from the filter bags and thus cleaning the filter bags.

One of the problems with this type of filtering apparauts is that the cleaning operation is not very effective in removing the particulate material from the filter bags. After the filter bags have been in use for a period of time they become increasingly clogged with particulate material. This undesirably increases the pressure drop across the filtering apparatus and significantly reduces its efficiency. In some filtering applications, the inability to effectively clean the filter bags of the particulate material is so severe that it is necessary to frequently replace the filter bags.

Also, as a result of the particulate material which is trapped in the filter bags and the resulting obstruction to air flow, the filtering apparatus must be designed with a relatively large number of filter bags and with a relatively low ratio of air flow to filter area in order that the filtering apparatus will remain serviceable as the filter bags become increasingly clogged with particulate material.

The presence of particulate material in the filter bags also causes abrasive wear of the bags and results in a shortened useful life. Typically, a filter bag will have a useful life of up to about two years. However, in severe applications, as for example where the particulate material is of a highly abrasive nature, the filter bags may wear out in a matter of weeks. Considering that the usual filtering apparatus may contain many hundreds of filter bags, and that a single bag may cost from fifty to one hundred dollars, the cost of continually replacing the filter bags makes the operational cost of the filtering apparatus quite high. Yet, in many applications the use of filtration apparatus is required by governmental air quality standards in order to limit the amount of particulate material in effluent gases.

In my copending U.S. application, Ser. No. 076,605 filed Sep. 18, 1979 and entitled BAG-TYPE FILTER APPARATUS WITH INTERNAL AIR DIFFUSER, I have disclosed an improvement in a bag-type filter which provides significantly more effective cleaning of a filter bag when a periodic reverse purge of air is directed into the filter bag. As disclosed in the aforementioned copending application, a hollow diffuser tube is provided interiorly of the conventional supporting cage which is provided within the filter bag for supporting and holding the filter bag in an open tubular configuration. The diffuser tube has one end thereof communicating with the outlet end of the filter bag and has perforations therein located for diffusing and disturbing air throughout the filter bag when a periodic reverse purge of air is directed into the outlet end of the filter bag. The more uniform distribution of the purge of air thoughout the filter bag provides considerably more effective cleaning of the filter bag than has heretofore been possible in a conventional bag type filter system.

SUMMARY OF THE INVENTION

The diffuser tube of the aforementioned copending application is particularly suited for installation in a filter which is already equipped with a cage for supporting and holding the filter bag. The present invention, like the aforementioned copending application, is concerned with improving the cleaning of a filter bag when a periodic reverse purge of air is directed into the outlet end thereof. In accordance with the present invention, however, there is provided within the filter bag a member which serves both for supporting and holding the filter bag is an open tubular configuration and for also diffusing and distributing throughout the filter bag the reverse purge of cleaning air which is periodically directed into the filter bag.

More particularly, in accordance with the invention an elongate tube is provided extending longitudinally within the filter bag, the tube having a series of spaced peripheral portions extending generally outwardly beyond other portions of the tube and serving for engaging the surrounding filter bag and holding the same in a generally open tubular configuration substantially out of contact with the portions of the tube located inwardly therefrom. Those inwardly located portions of the tube have perforations thereon located for diffusing and distributing air throughout the filter bag when a periodic reverse purge of air is directed into the tube. Thus, the elongate perforated tube of this invention serves as a combination bag support and air diffuser when installed within a conventional tubular filter bag.

In accordance with one embodiment of the invention as illustrated herein, the series of outwardly extending peripheral portions of the combination bag support and air diffuser tube, hereinafter termed support-diffuser tube, are in the form of longitudinally extending fins projecting radially outwardly at spaced locations about the periphery of the tube for supporting and holding the filter bag in an open tubular configuration substantially out of contact with the inwardly positioned portion of the tube. The perforations are located in the inwardly positioned portions of the tube for diffusing and distributing air throughout the filter bag when a periodic reverse purge of air is directed into the tube.

In accordance with another embodiment of the invention, the support-diffuser tube is of a longitudinally corrugated construction having a series of longitudinally extending peaks defining longitudinally extending inwardly located troughs therebetween at spaced locations about the periphery of the tube. The series of longitudinally extending peaks serve for engaging the surrounding filter bag and holding the same in a generally open tubular configuration substantially out of contact with the inwardly located troughs of the tube, and the troughs have perforations therein located for diffusing and distributing air throughout the filter bag when a periodic reverse purge of air is directed into the tube.

In one illustrated form of the invention the perforations are substantially uniformly arranged so as to provide a substantially uniform void area throughout the longitudinal extent of the tube. However, in an alternate form of the invention the perforations may be arranged so as to provide a smaller void area adjacent the end of the tube where the reverse purge of air is directed into the tube and a larger void area adjacent the opposite end of the tube. This arrangement may be desirable in some instances depending upon the length and other dimensions of the tubular filter bag in order to assist in achieving a more uniform distribution of the reverse purge of air throughout the longitudinal extent of the filter bag.

Since the perforated wall of the support-diffuser tube of the present invention presents an obstruction to the flow of air through the filter as compared to the conventional type of supporting cage used within a filter bag, it would normally be thought that the support-diffuser tube of this invention would interfere with the following operation by undesirably increasing the pressure drop across the filter. However, it has been surprisingly determined that the flow obstruction presented by the support-diffuser tube of the present invention does not interfere with the filtering operation, but in fact, significantly enhances the filtering operation by providing improved and more effective cleaning of the filter bag. The support-diffuser tube of the invention does produce a slight flow obstruction and results in a somewhat increased pressure drop upon start-up with a new filter bag installed. However, once the filter bag has been placed into service and undergone one or more cleaning cycles, the pressure drop through the filter bag is actually considerably lower than in the prior art filter arrangements as a result of the substantially more effective cleaning of the filter bag. The increased cleaning efficiency which is achieved results in increasing the volumetric flow rate through the filter at a given pressure drop by some two or three times. This means that the number of filter bags needed for a particular set of conditions can be significantly reduced. No longer will it be necessary for filter baghouses to be overdesigned in order to take into account or compensate for the reduction in efficiency and increased pressure drop which occurs as the filter bags become clogged during normal service. Thus, the present invention can provide a very significant savings in the overall initial cost of a filtering apparatus, and an attendant benefit in reduced maintenance and operational costs.

A further feature and advantage of the present invention is that the useful life of the filter bags is greatly increased. The frequent need for replacing filter bags due to abrasive wear, as noted earlier, results in considerable down time and a very substantial operating cost. The enhanced cleaning efficiency which is achieved by the present invention results in the removal of particles which would otherwise have remained in the pores of the filter bag to cause abrasive wear of the fabric forming the filter bag. Furthermore, the presence of the hollow perforated tube inside the filter bag serves to separate or insulate the inner surfaces of the filter bag from the high velocity stream of filtered air emerging from the outlet end of the filter bag, which would otherwise flow along the inner surface of the filter bag and cause additional wear in this area. Also, by diffusing and distributing the cleaning pulse of air throughout the filter bag, the perforated tube of the invention prevents the filter bag from receiving excessive flexing from a concentrated blast or pulse of air and thereby also serves to increase the life of the filter bag.

BRIEF DESCRIPTION OF THE DRAWINGS

Some of the features and advantages of the invention having been stated, others will become apparent as the description proceeds when taken in connection with the accompanying drawings in which—

FIG. 1 is a cross-sectional view of a filtering apparatus of the type employing a plurality of bag-type tubular filters;

FIG. 2 is a persepctive view, with parts broken away, showing the combination bag support and air diffuser tube of the present invention;

FIG. 3 is a side view thereof with a filter bag installed thereon;

FIG. 4 is a sectional view thereof taken substantially along the line 4—4 of FIG. 3;

FIG. 5 is a side view showing a modified form of the support-diffuser tube wherein the perforations are of a non-uniform arrangement so as to provide a larger void area adjacent one end of the tube than at the opposite end thereof;

FIG. 6 is a perspective view, with parts broken away, showing a combination bag support and air diffuser tube constructed in accordance with a second embodiment of the invention;

FIG. 7 is a cross-sectional view thereof; and

FIG. 8 is a side view showing a modified form of the support-diffuser tube wherein the perforations are of a non-uniform distribution as in FIG. 5.

DESCRIPTION OF THE ILLUSTRATED EMBODIMENT

Referring now more particularly to the drawings, FIG. 1 illustrates a conventional filtering apparatus of the type utilizing elongate baglike tubular filters. The filtering apparatus includes a filter housing, commonly referred to as a "baghouse," which is divided by a horizontal wall 11 into a lower filtering chamber 12 and an upper filtered air plenum. A plurality of elongate hollow tubular filter bags, indicative by the reference character 14, are mounted in the filtering chamber 12 in a generally vertical orientation with the upper ends thereof communicating with the filtered air plenum via holes provided in the wall 11.

An inlet duct 15 directs particulate-laden gas into the filtering chamber 12, where it passes around the respective filter bags 14 and then flows through the gas permeable filter bags while the particulate material is filtered and retained on the exterior surface of the filter bags. After passing into the hollow interior of the filter bags 14, the filtered gas passes upwardly through the outlet ends of the respective filter bags and into the filtered air chamber. From there, the filtered gas is directed to and through an outlet duct 16.

As the particulate material builds up on the exterior surface of the filter bags 14, it becomes necessary to clean the filter bags and dislodge the accumulated particulate material therefrom. This is accomplished by periodically directing a purging flow of air through the filter bags in a reverse direction. In the illustrated filtering apparatus, purge air from a compressed air source 17 is directed into the filtering air plenum by momentarily opening a valve 18 provided in a compressed air line 19. At the same time, a valve 21 is moved from the position shown in solid lines to that shown in broken lines by suitable actuator 22, such as a penumatic or hydraulic piston, so as to block the filtered air outlet leading to the outlet duct 16. Consequently, the compressed air is directed in a reverse direction into the outlet ends of the respective filter bags 14. The particulate material which is dislodged from the filter bags is accumulated at the lower end of the filter housing and removed by a screw conveyor 23.

The filter cleaning system utilized in the filtration apparatus illustrated in FIG. 1 is of the type wherein all of the tubular filter bags associated with the filtered air plenum are simultaneously purged with a pulse of compressed air. In another known type of cleaning system for this type of filtered apparatus, compressed air conduits are associated with the outlet ends of each of the respective filter bags so as to selectively direct a pulse jet of compressed air into respective filter bags. Still another known type of cleaning system utilizes a reverse flow of air of longer duration, rather than a pulse of air, for cleaning the filter bags. As will become apparent as the description proceeds, the present invention is applicable to all of these known types of cleaning systems.

Referring now to FIG. 2, reference character 30 generally indicates a combination bag support and air diffuser tube constructed in accordance with a first embodiment of the invention. The support-diffuser tube 30 is constructed in such a way as to serve not only for supporting and holding the filter bag in an open tubular configuration, but also serving as an air diffuser tube for diffusing and distributing air throughout the filter bag when a periodic reverse purge of air is directed into the bag.

As illustrated, the support-diffuser tube 30 has a series of spaced peripheral portions which extend generally outwardly beyond other portions of the tube and serve for engaging the surrounding filter bag and holding the same in a generally open tubular configuration. More particularly, in the embodiment of the invention illustrated in FIGS. 2-5, the spaced outwardly projecting peripheral portions of the tube are in the form of relatively narrow bladelike fins 31 which project outwardly beyond the inwardly located remaining portions 32 of the tube. The fins 31 are longitudinally coextensive with the tube 30 and project outwardly in a radial direction. The fins 31 are of substantially uniform height and substantially equally spaced apart about the circumference of the tube. As illustrated, the fins 31 are integrally formed with the inwardly located portions 32 of the tube and are formed by the wall of the tube being folded back upon itself. Preferably, and as illustrated, the outermost edge of each fin 31 has an enlarged rounded or bulbous formation 33 formed therein to provide a rounded smooth surface for engagement with the surrounding filter bag so as to reduce wear on the filter bag in this area.

As illustated, the inwardly located portions 32 of the tube have perforations 34 formed therein, with the fins 31 being unperforated. As best seen in FIG. 4, the fins 31 are of such a size and spacing as to hold the filter bag 14 in an open tubular configuration substantially out of contact with the perforated inwardly located portions 32 of the tube.

During the normal filtering operation, the perforations 34 permit the filtered air which passes through the filter bag 14 to flow into the hollow interior portion of the tube 30 where it may then flow outwardly into the filtered air manifold. During the cleaning operation when a blast or pulse of reverse purge air is directed into the hollow interior of the tube 30, the perforations 34 serve for diffusing and distributing the reverse purge of air throughout the filter bag so that all portions of the filter bag are more effectively cleaned by the reverse purge of air.

At the upper end of the support-diffuser tube 30, which serves as the outlet for the filtered air in the arrangement illustrated in FIG. 1, there is provided an annular end ring 35, the inner diameter of which corresponds substantially to the inner diameter of the tube 30. The outer extent of the end ring 35 projects toward the outermost edges 33 of the fins 31 to provide a flange at the upper end of the tube to assist in mounting the tube 30 to the wall 11 of the baghouse. A circumferential band 36 is provided at the upper end of the tube 30 underlying the end ring 35 and surrounding the fins 31. This band 36 serves to facilitate mounting the filter bag 14 to the tube 30. The lower end of the tube 30 is closed by an end cap 37.

The support-diffuser tube 30 may be formed of any suitable material which is capable of withstanding the conditions to which the filtering system is subjected. A ductile metallic sheet material, such as steel or stainless steel, is particularly suitable for fabricating a support-diffuser tube in the formations specifically illustrated herein, but those skilled in the art will readily appreciate that other materials and other methods of manufacture can be suitably employed in producing a support-diffuser tube within the scope and spirit of the invention.

One of the primary reasons for the ineffective cleaning of the conventional filter bag arrangement of the prior art is that the pulse or blast of reverse purge air was concentrated in the area adjacent where it entered the interior of the filter, namely adjacent the outlet end of the filter. The effect of the reverse purge ws substantially dissipated at the far end of the filter from the air outlet. Thus, while the outlet end of the filter was being acted upon by the reverse purge of air, and in fact may have actually been over cleaned, the far end of the filter was essentially left uncleaned. As a result, the entire length of the filter bag was not being effectively utilized for filtration and the efficiency of the filter diminished accordingly.

The combination bag support and air diffuser tube 30 of the present invention performs the function of diffusing and distributing the pulse or blast of cleaning air over the entire filter bag to thus provide much more effective and efficient cleaning of the filter bag. It has been determined that up to 30% by weight more particulate material is removed from the filter bag as a result of the diffusing and distributing of the pulse or blast of cleaning air. Also, as a result of the enhanced cleaning, the volume of air which can flow through the filter bag at a given pressure drop operation is increased by some two to three times.

The concentration of the cleaning air pulse adjacent the outlet end of the filter under the prior conventional arrangement also resulted in excessive flexing of the filter bag in that area. The more even distribution of the cleaning air as a result of the provision of the support-diffuser tube 30 avoids this overflexing of the filter bag and thereby contributes to an increased useful life of the bag.

Another factor which has heretofore contributed to the wear of the filter bag is the high velocity flow of air along the inside surfaces of the filter bag adjacent the outlet end of the filter. When the velocity of the air as it passes through the filter bag is relatively low, the air velocity interiorly of the filter bag adjacent the outlet end thereof is considerably higher because of the reduced crosssectional flow area as compared to the overall surface area of the filter bag. This relatively high velocity air, together with the dust particles which pass through the filter bag and are entrained in the air, would normally flow across the interior surface of the filter bag and cause additional wear and abrasion in this area. The provision of the support-diffuser tube of the present invention inside the filter bag serves to separate or insulate the interior surface of the filter bag from this high velocity air, thereby further contributing to the increased life of the filter bag.

In the embodiment illustrated in FIGS. 2–4, the perforations 34 are of a substantially uniform size and spacing throughout the longitudinal and circumferential extent of the tube 30. Preferably, the size and spacing of the perforations 34 is such that the diffuser tube has a void area of from about 35% to about 50%. In some instances, depending upon the length and diameter of the filter and other factors, it may be desirable for the void area defined by the perforations to vary over the length of the elongate support-diffuser tube 30. By providing a lower percentage void area adjacent the end of the tube closest to where the reverse purge of air enters and a higher void area adjacent the opposite end of the tube, the variation in void area may be utilized to assist in increasing the effect of the reverse purge of air at the far end of the tube, and to thereby achieve a more effective distribution of the reverse purge of air throughout the longitudinal extent of the tube. Thus, in the modified form of the invention illustrated in FIG. 5, where the support-diffuser tube is indicated by the reference character 30', it will be seen that the percentage void area defined by the perforations 34 varies over the longitudinal extent of the tube. This is accomplished by varying the spacing of the successive rows of perforations. The brackets A–D in FIG. 5 indicate that the tube 30' has four distinct zones of differing void area. In the uppermost zone A closest to where the reverse purge of air enters the tube the rows of perforations are relatively widely spaced apart. In the succeeding Zones B, C and D, the rows of perforations are increasingly more closely spaced. Consequently, the percentage void area is relatively low in the uppermost Zone A closest to where the reverse purge of air enters the tube, and is relatively high in Zone D adjacent the opposite end of the tube.

In FIGS. 6 and 7, the reference character 40 generally indicates a support-diffuser tube constructed in accordance with a second embodiment of the invention. As in the previously described embodiment, the support-diffuser tube 40 has a series of spaced peripheral portions which extend generally outwardly beyond other portions of the tube and serve for engaging the surrounding filter bag and holding the same in a generally open tubular configuration, and these outwardly extending peripheral portions serve for holding the filter bag substantially out of contact with the inwardly located portions of the tube.

In this embodiment of the invention, the support-diffuser tube 40 is of a longitudinally corrugated construction having a series of spaced longitudinally extending peaks 41 with longitudinally extending troughs 42 formed therebetween and located inwardly of the peaks 41. The peaks 41 are of such a height and spacing in relation to the troughs 42 so as to hold the filter bag 14 substantially out of contact with the troughs 42. As illustrated, perforations 44 are provided in the troughs 42 for diffusing and distributing air throughout the filter bag when a reverse purge of air is directed into the tube. As in the previous embodiment, the elongate tube has an annular end ring 45 at the upper or outlet end thereof, with the outer extent of the end ring 45 projecting beyond the outermost edges of the peaks 41 to provide a flange to assist in mounting the tube 40 to the wall 11 of the baghouse. A circumferential band is provided at the upper end of the tube underlying the end ring 45 and surrounding the peaks 41. This band serves to facilitate mounting the filter bag 14 to the tube 40. The lower end of the tube 40 is closed by an end cap 47.

The modified form of the support-diffuser tube shown in FIG. 8 and indicated by the reference character 40' is similar to that illustrated and described in connection with FIG. 5 in that the perforations 44 are of a non-uniform distribution or arrangement so as to provide a smaller void area at the end of the tube adjacent where the reverse purge of air enters the tube (Zone A) and a larger void area adjacent the opposite end of the tube (Zone D). Since the purpose and function of this modified form has been previously described in connection with FIG. 5, a further description is not deemed necessary here.

In the drawings and specification, there have been set forth preferred embodiments of the invention, and although specific terms are employed, they are used in a generic and descriptive sense only and not for purposes of limitation.

That which is claimed is:

1. In a filter apparatus of the type wherein a particulate-laden gas is directed through a tubular filter bag for filtering and retaining the particulate material on the exterior of the filter bag, and wherein the filter bag is cleaned by a periodic reverse purge of air directed into one end of the filter bag, the combination therewith of means positioned within said filter bag and serving for supporting and holding the filter bag in an open tubular configuration and for also diffusing and distributing air throughout the filter bag when a periodic reverse purge of air is directed into the filter bag so as to thereby more effectively clean the filter bag while also reducing excessive flexing of the filter bag and abrasive wear thereof, said means comprising an elongate tube extending longitudinally within said filter bag, said tube having a series of spaced peripheral portions extending generally outwardly beyond other portions of the tube and serving for engaging the surrounding filter bag and holding the same in a generally open tubular configuration substantially out of contact with said other portions of the tube, and wherein said other portions of the tube have perforations therein located for diffusing and distributing air throughout the filter bag when a periodic reverse purge of air is directed into the tube.

2. The combination as set forth in claim 1 wherein the spaced peripheral portions of said series are of substantially uniform height and are substantially uniformly spaced apart about the periphery of the tube.

3. The combination as set forth in claim 2 wherein said peripheral portions are longitudinally coextensive with said tube and extend in a direction generally parallel to the longitudinal axis thereof.

4. The combination as set forth in claim 1 wherein said series of spaced peripheral portions comprises a series of longitudinally extending fins projecting radially outwardly beyond said other portions of said tube.

5. The combination as set forth in claim 4 wherein the outwardly projecting fins of said series are of substantially uniformly height and are substantially uniformly spaced from one another about the periphery of said tube.

6. The combination as set forth in claim 1 wherein said hollow tube is of corrugated construction including longitudinally extending peaks at spaced locations about the periphery of the tube and longitudinally extending inwardly located troughs between said peaks, and wherein the outwardly extending peripheral projections of said tube are defined by said peaks.

7. The combination as set forth in claim 1 wherein said perforations are uniformly arranged so as to provide a substantially uniform void area throughout the longitudinal extent of said tube.

8. The combination as set forth in claim 1 wherein said perforations are arranged so as to provide a smaller void area adjacent the end of the tube where the reverse purge of air is directed into the tube and a larger void area adjacent the opposite end of the tube.

9. In a filter apparatus of the type wherein a particulate-laden gas is directed through a tubular filter bag for filtering and retaining the particulate material on the exterior of the filter bag, and wherein the filter bag is cleaned by a periodic reverse purge of air directed into one end of the filter bag, the combination therewith of means positioned within said filter bag and serving for supporting and holding the filter bag in an open tubular configuration and for also diffusing and distributing air throughout the filter bag when a periodic reverse purge of air is directed into the filter bag so as to thereby more effectively clean the filter bag while also reducing excessive flexing of the filter bag and abrasive wear thereof, said means comprising an elongate tube extending longitudinally within said filter bag, said tube having a series of longitudinally extending outwardly projecting fins integrally formed therewith at spaced locations about the periphery of the tube and serving for engaging the surrounding filter bag and holding the same in a generally open tubular configuration substantially out of contact with the inwardly positioned portions of the tube located between said fins, and wherein said inwardly positioned portions of the tube have perforations therein located for diffusing and distributing air throughout the filter bag when a periodic reverse purge of air is directed into the tube.

10. In a filter apparatus of the type wherein a particulate-laden gas is directed through a tubular filter bag for filtering and retaining the particulate material on the exterior of the filter bag, and wherein the filter bag is cleaned by a periodic reverse purge of air directed into one end of the filter bag, the combination therewith of means positioned within said filter bag and serving for supporting and holding the filter bag in an open tubular configuration and for also diffusing and distributing air throughout the filter bag when a periodic reverse purge of air is directed into the filter bag so as to thereby more effectively clean the filter bag while also reducing excessive flexing of the filter bag and abrasive wear thereof, said means comprising an elongate longitudinally corrugated tube having a series of longitudinally extending peaks at spaced locations about the periphery of the tube and longitudinally extending troughs located inwardly of and between said peaks, said series of longitudinally extending peaks serving for engaging the surrounding filter bag and holding the same in generally an open tubular configuration substantially out of contact with the troughs, and wherein said troughs have perforations therein located for diffusing and distributing air throughout the filter bag when a periodic reverse purge of air is directed into the tube.

* * * * *

UNITED STATES PATENT AND TRADEMARK OFFICE
CERTIFICATE OF CORRECTION

PATENT NO. : 4,259,095
DATED : March 31, 1981
INVENTOR(S) : Allen S. Johnson, Jr.

It is certified that error appears in the above-identified patent and that said Letters Patent are hereby corrected as shown below:

Column 2, Line 2, "disturbing" should be --distributing--.

Column 3, Line 21, "following" should be --filtering--.

Column 4, Line 12, "persepctive" should be --perspective--; same column, Line 42, "indicative" should be --indicated--.

Column 5, Line 13, "filtered" should be --filtering--.

Column 6, Line 11, "toward" should be --beyond--; same column, Line 35, "ws" should be --was--.

Column 7, Line 3, "crosssectional" should be --cross-sectional--.

Signed and Sealed this

Thirtieth Day of June 1981

[SEAL]

Attest:

RENE D. TEGTMEYER

*Attesting Officer*　　*Acting Commissioner of Patents and Trademarks*